(12) United States Patent
Farrelly et al.

(10) Patent No.: US 8,299,794 B2
(45) Date of Patent: Oct. 30, 2012

(54) METHOD FOR ELECTROMAGNETIC GEOPHYSICAL SURVEYING OF SUBSEA ROCK FORMATIONS

(75) Inventors: Brian Anthony Farrelly, Rådal (NO); Svein Erling Johnstad, Bønes (NO)

(73) Assignee: Norsk Hydro ASA, Oslo (NO)

( * ) Notice: Subject to any disclaimer, the term of this patent is extended or adjusted under 35 U.S.C. 154(b) by 323 days.

(21) Appl. No.: 12/227,577

(22) PCT Filed: May 16, 2007

(86) PCT No.: PCT/NO2007/000175
§ 371 (c)(1),
(2), (4) Date: Mar. 3, 2009

(87) PCT Pub. No.: WO2007/136276
PCT Pub. Date: Nov. 29, 2007

(65) Prior Publication Data
US 2009/0243617 A1   Oct. 1, 2009

(30) Foreign Application Priority Data

May 24, 2006  (NO) .................................... 20062365

(51) Int. Cl.
*G01V 3/00* (2006.01)
(52) U.S. Cl. .......................... 324/337; 324/332; 324/365
(58) Field of Classification Search .................. 324/117, 324/500, 503, 512, 537; 315/77, 83, 88, 315/135, 217, 244; 340/642, 643
See application file for complete search history.

(56) References Cited

U.S. PATENT DOCUMENTS

| | | | |
|---|---|---|---|
| 3,744,021 A * | 7/1973 | Todd | 367/23 |
| 4,715,020 A | 12/1987 | Landrum, Jr. | |
| 6,545,944 B2 | 4/2003 | de Kok | |
| 7,277,806 B2 * | 10/2007 | Lu et al. | 702/76 |
| 2003/0050759 A1 | 3/2003 | Srnka et al. | |

(Continued)

FOREIGN PATENT DOCUMENTS

GB   2 411 006   8/2005

(Continued)

OTHER PUBLICATIONS

International Search Report issued Aug. 28, 2007 in the International (PCT) Application of which the present application is the U.S. National Stage.

(Continued)

*Primary Examiner* — Vinh Nguyen
(74) *Attorney, Agent, or Firm* — Wenderoth, Lind & Ponack, L.L.P.

(57) ABSTRACT

A method for electromagnetic geophysical surveying of rock formations (1) under a sea-floor (3) comprising the following steps: *—towing first and second alternating field ($E_1$, $E_2$) emitting sources ($s_1$, $S_2$) in first and second depths below the sea surface, said first field ($E_1$) having a first phase ($\Phi_1$);—said second alternating field ($E_2$) given a second phase ($\Phi_2$) different from said first phase ($\Phi_1$), said sources ($S_1$, $S_2$) constituting a phased array emitter antenna with directivity for transmitting a major proportion of the combined electromagnetic energy downwards;—said first and second fields ($E_1$, $E_2$) for propagating partly down through the sea-floor (3) and being reflected and/or refracted through said rock formations (1) and partly propagating back through the seafloor (3);—said first and said second fields ($E_1$, $E_2$) for merging to a total field and being measured by electromagnetic receivers ($r_1$, $r_2$, . . . , $r_n$) recording corresponding field registrations ($E_{r1}(t)$, $E_{r2}(t)$, $E_{r3}(t)$, . . . , $E_{rn}(t)$).

14 Claims, 6 Drawing Sheets

U.S. PATENT DOCUMENTS

2007/0288211 A1* 12/2007 MacGregor et al. .............. 703/5
2009/0005994 A1*  1/2009 Srnka et al. ....................... 702/7
2010/0233955 A1*  9/2010 Hornbostel et al. ............ 455/40

FOREIGN PATENT DOCUMENTS

| | | |
|---|---|---|
| RU | 2 236 028 | 9/2004 |
| RU | 53 460 | 5/2006 |
| WO | 2005/006022 | 1/2005 |
| WO | 2006/000538 | 1/2006 |
| WO | 2006/052145 | 5/2006 |
| WO | 2007/097787 | 8/2007 |

OTHER PUBLICATIONS

Patent Cooperation Treaty (PCT) International Preliminary Report on Patentability, issued Aug. 22, 2008 in International Application No. PCT/NO2007/000175.

Canadian Office Action issued Mar. 3, 2011 in corresponding Canadian Application No. 2,654,199.

Supplementary European Search Report mailed Feb. 10, 2012 in European Application No. 07 74 7636.

* cited by examiner

Fig. 3a: first CSEM leg over target formations

Fig. 3b: second CSEM leg over target formations

METHOD FOR ELECTROMAGNETIC GEOPHYSICAL SURVEYING OF SUBSEA ROCK FORMATIONS

BACKGROUND OF THE INVENTION (1) Field of the Invention

The present invention relates to a method for electromagnetic geophysical surveying of subsea rock formations. The method comprises towing first and second alternating field emitting sources in first and second depths or elevations above the sea-floor, the transmitter sources controlled for having different phases and amplitudes in order to constitute a phased array emitter antenna with directivity. The directivity is useful for reducing upward-propagating energy which leads to a head wave or "air wave", and also for ensuring that a major proportion of the transmitted energy propagates downwards into the subsea formations.

The rock formations under the seafloor are water-saturated and the saline pore-fluid contains ions, giving the rock formations a high electrical conductivity, or low resistivity, $\rho=0.7\text{-}10$ $\Omega$m. In this description resistivity will be used, expressed in Ohm-meter, abbreviated $\Omega$m. Hydrocarbons such as oil and gas replace water in the pore spaces of porous petroleum bearing rock formations. Petroleum does not dissolve salts and thus leads to a low electrical conductivity of petroleum-bearing rocks, corresponding to a high resistivity, $\rho=20\text{-}300$ $\Omega$m, and in some instances a resistivity as high as $\rho=1000$ $\Omega$m. Portions of the otherwise oil-bearing formation filled with brine as pore fluid may not be electromagnetically distinguishable from the overburden. Sea water contains several dissolved salts and usually provides a resistivity of about $\rho=0.3$ $\Omega$m.

Such buried potentially petroleum-bearing sedimentary rock formations are the target of most geophysical surveys. Geological structures may be subject to seismic surveys, e.g. reflection or refraction seismics, amplitude variation with offset, etc., but petroleum bearing portions of a sedimentary rock formation do not always show seismic characteristics that are distinguishable from water-bearing portions of similar formations that are subject to the seismic analysis.

(2) Description of Related Art

In their patent application US 2003/0052685, "Method and apparatus for determining the nature of subterranean reservoirs", and an article called "Remote detection of hydrocarbon filled layers using marine controlled source electromagnetic sounding", EAGE 64th Conference & Exhibition, Florence, Italy, 27-30 May 2002, Eidesmo et al. describe electromagnetic investigations using a horizontally arranged electrical dipole transmitter and electrical dipole receiving antennae arranged over a seafloor with a deeply buried hydrocarbon layer. The receiver dipole antennae are two horizontally arranged orthogonal sets of electrodes. Eidesmo et al. use phase information extracted from a presumably refracted wave response to determine whether there is a high-resistivity potentially petroleum-bearing subterranean reservoir present.

Srnka and Carazzone's US patent application 2003/0050759 relates to a method of simulating emission of a signal of an electromagnetic source using one or more dipole sources. A dipole source is located at an excitation location corresponding to a segment of the electromagnetic source to be simulated. The virtual electromagnetic source comprises a pattern of dipoles distributed in a horizontal plane of the sea. The dipole source is activated, and an electromagnetic signal is recorded at one or more receiver locations. The process is repeated for additional excitation locations corresponding to additional segments in the virtual pattern to be filled in by the electromagnetic source. The data from the sequence of dipole source excitation locations is subsequently processed to determine the simulated signal of the electromagnetic source.

One important purpose of the Srnka patent application is to use a virtual dipole source array in order to simulate a very large circular transmitter in order to simulate focusing of the electromagnetic energy on the target under the overburden. The method of Srnka does not provide a solution to the problem of airborne electromagnetic waves. Much of the electromagnetic energy emitted from the antenna will propagate upward toward the sea surface and propagate through the air. Some of the upward propagating energy emitted from the antenna will also reflect from the sea surface and blur the initially transmitted signal. There is a need to reduce the upward transmitted electromagnetic signal. There is also a prevailing need for producing a stronger electromagnetic signal to propagate downwards from the transmitter antenna and through the seafloor for propagating through the rock formations to be surveyed.

BRIEF SUMMARY OF THE INVENTION

Some of the disadvantages of the background art may be significantly reduced by either of two alternative embodiments of the present invention:

- a first embodiment of the invention employs a real transmitter antenna array comprising at least two transmitter antennas;
- a second and alternative embodiment of the invention employs a virtual antenna array comprising at least two towing surveys of a transmitter antenna.

The first, materially real alternative of the invention is a method for electromagnetic geophysical surveying of rock formations under a sea-floor, comprising the following steps:

towing first and second alternating electromagnetic field $E_1$, $E_2$ emitting sources $s_1$, $s_2$ in first and second depths or elevations $h_1$, $h_2$ above the sea-floor 3, said first field $E_1$ having a first phase $\phi_1$ and amplitude $A_1$;

said second alternating field $E_2$ given a second phase $\phi_2$ and amplitude $A_2$ different from said first phase $\phi_1$ and amplitude $A_1$, said sources $s_1$, $s_2$ constituting a phased array emitter antenna with directivity for transmitting a major proportion of the energy downwards and for transmitting a significantly smaller proportion of the energy upwards toward the sea surface;

said first and second fields $E_1$ $E_2$ propagating partly down through the sea-floor 3 and being reflected and/or refracted through said rock formations 1 and partly propagating back through the seafloor 3;

said first and said second fields $E_1$, $E_2$ merging to a combined field and being measured by electromagnetic receivers $r_1$, $r_2$, ..., $r_n$ recording corresponding field registrations $E_{r1}(t)$, $E_{r2}(t)$, $E_{r3}(t)$, ..., $E_{rn}(t)$.

Ideally, the proportion of the energy transmitted upwards toward the sea surface should be as small as possible, near zero.

In this first embodiment of the invention, the phase difference and amplitude ratio between the two transmitters may be fixed if one single basic frequency is used. One purpose of the invention is to use an array of two vertically separated horizontal dipole transmitters, electrical or magnetic, having an amplitude ratio and a phase difference, and depending on their vertical separation and depth and elevation over the seafloor, to interfere destructively immediately below the sea surface, so that sea surface reflection is significantly reduced or totally eliminated.

Additionally, one may achieve a similar result using vertically displaced pairs of receivers.

The second alternative of the method according to the present invention provides a virtual dual dipole transmitter array that in its simplest embodiment requires the use of one single transmitter antenna. It is defined as a method for electromagnetic geophysical surveying of rock formations 1 under a sea-floor 3 comprising the following steps:

towing a first alternating electromagnetic field $E_1$ emitting source $s_{[1]}$ at a first depth or elevation $h_1$ above the sea-floor 3, said first field $E_1$ having a first phase $\phi_1$ and amplitude $A_1$;

said first field $E_1$ propagating partly down through the sea-floor 3 and being reflected and/or refracted through said rock formations 1 and partly propagating back through the seafloor 3;

said first field $E_1$ being measured by electromagnetic receivers $r_1, r_2, \ldots, r_n$ and recording corresponding first field registrations $E_{1r1}(t), E_{1r2}(t), E_{1r3}(t), \ldots, E_{1rn}(t)$.

The characterizing steps of this alternative embodiment of the invention are the following:

towing a second alternating field $E_2$ emitting source $s_{[2]}$ at a second depth or elevation $h_2$ above the sea-floor 3, said second alternating field $E_2$ given a second phase $\phi_2$ and amplitude $A_2$ which need not differ from those of the first field;

said second field $E_2$ propagating partly down through the sea-floor 3 and being reflected and/or refracted through said rock formations 1 and partly propagating back through the seafloor 3;

said second field $E_2$ being measured by electromagnetic receivers $r_1, r_2, \ldots, r_n$ and recording corresponding second field registrations $E_{2r1}(t), E_{2r2}(t), E_{2r3}(t), \ldots, E_{2rn}(t)$;

combining said first and second registered fields $E_{1r1}(t)+E_{2r1}(t), E_{1r2}(t)+E_{2r2}(t), E_{1r3}(t)+E_{2r3}(t), \ldots, E_{1rn}(t)+E_{2rn}(t)$ with an imposed phase difference and amplitude ratio to a total field $E_{r1}(t), E_{r2}(t), E_{r3}(t), \ldots, E_{rn}(t)$ such that the combined field emulates measurements resulting from emission from a phased array emitting antenna composed of alternating field sources $s_1, s_2$ having directivity in order to transmit a major proportion of alternating field energy downwards through the seafloor 3 and a highly reduced proportion of energy upwards.

The proportion of the combined energy transmitted upwards should be as small as possible for this virtual dual dipole alternative embodiment just as it should for the real dual dipole embodiment.

During said second alternating field $E_2$ emission, said amplitude $A_2$ is not required to differ from those of the first field, because during both field emission traverses using a controlled-source electromagnetic transmitter, one would normally prefer to transmit at maximum allowed power in order to receive a strong and clear signal at the receiver ends. The amplitude ratio adjustment for the combined signal may be conducted during the subsequent processing stages.

In this second and alternative embodiment of the invention, the phase and amplitude may advantageously be varied in the analysis according to the desire of the geophysicist in order to utilize a phase and amplitude difference that provides an advantageous directivity or useful registrations of a potential petroleum bearing formation. In this virtual array embodiment of the invention the recorded signals may be combined to simulate destructive interference immediately below the sea surface, so as to reduce sea surface reflection and cancel of the air waves.

Further developments of this idea may be envisaged in which the horizontal electric dipoles may be replaced by other sources such as vertical electric dipoles, horizontal or vertical magnetic dipoles. Furthermore, the simple vertical separation of two vertically separated sources may be expanded to more complicated arrays of three or more vertically separated sources in order to provide a desired antenna pattern, or expanding the vertically separated source pattern to include a horizontal portion of the array in order to increase directivity. Similarly, the adjustment of phase difference and amplitude ratio in the processing in the second embodiment may be combined with the simultaneous towing of the sources of the first embodiment if the signals from the two sources are made distinguishable by some form of multiplexing.

There are some important advantages due to the directivity of the vertically displaced antennas according to the invention: one advantage is that one may practice or simulate transmission of a stronger electromagnetic signal in the downwards direction in order to better find and observe the target petroleum bearing formations. A second and important advantage is that one may significantly reduce the upwards propagating energy, either by real or virtual means, thus significantly reducing undesired air waves and possibly cancel sea-surface reflections and possible multiples in the sea.

BRIEF DESCRIPTION OF THE DRAWINGS

FIG. 1 illustrates a first alternative embodiment of the invention, a real-array method comprising simultaneous towing of two horizontally extending electric dipoles $s_1$ and $s_2$ through the sea. The dipoles are vertically displaced relative to each other, and are operated at different phases $\phi_1$ and $\phi_2$, and amplitudes $A_1$ and $A_2$, respectively. Electromagnetic receivers $r_1, r_2, \ldots, r_n$ such as electric dipole antennas or magnetic receivers are arranged along the seafloor 3 for measuring the electromagnetic field that has propagated preferably through the rocks. A potential petroleum bearing formation 2 is seen below a geological overburden 1. Reflection and refraction paths are illustrated. A source-normalized electric field intensity curve is also illustrated for one single receiver, here receiver $r_4$.

FIG. 3 illustrates the second and alternative virtual array embodiment of the invention, in which two separate towing legs are conducted using a transmitter s at different depths (or different elevations) along the same path over the seafloor. The first field registrations $E_{1r1}(t), E_{1r2}(t), E_{1r3}(t), \ldots, E_{1rn}(t)$ from the first leg and the second field registrations $E_{2r1}(t), E_{2r2}(t), E_{2r3}(t), \ldots, E_{2rn}(t)$ from the second leg may subsequently be added or otherwise combined during signal post-processing to $E_{r1}(t), E_{r2}(t), E_{r3}(t), \ldots, E_{r\,n}(t)$ for emulating measurements resulting from emission from a phased array emitting antenna set of alternating field sources $s_1, s_2$ having directivity in order to simulate transmission of a major proportion of alternating field energy downwards through the seafloor 3 and none upwards.

DETAILED DESCRIPTION OF THE INVENTION

Figure 1:
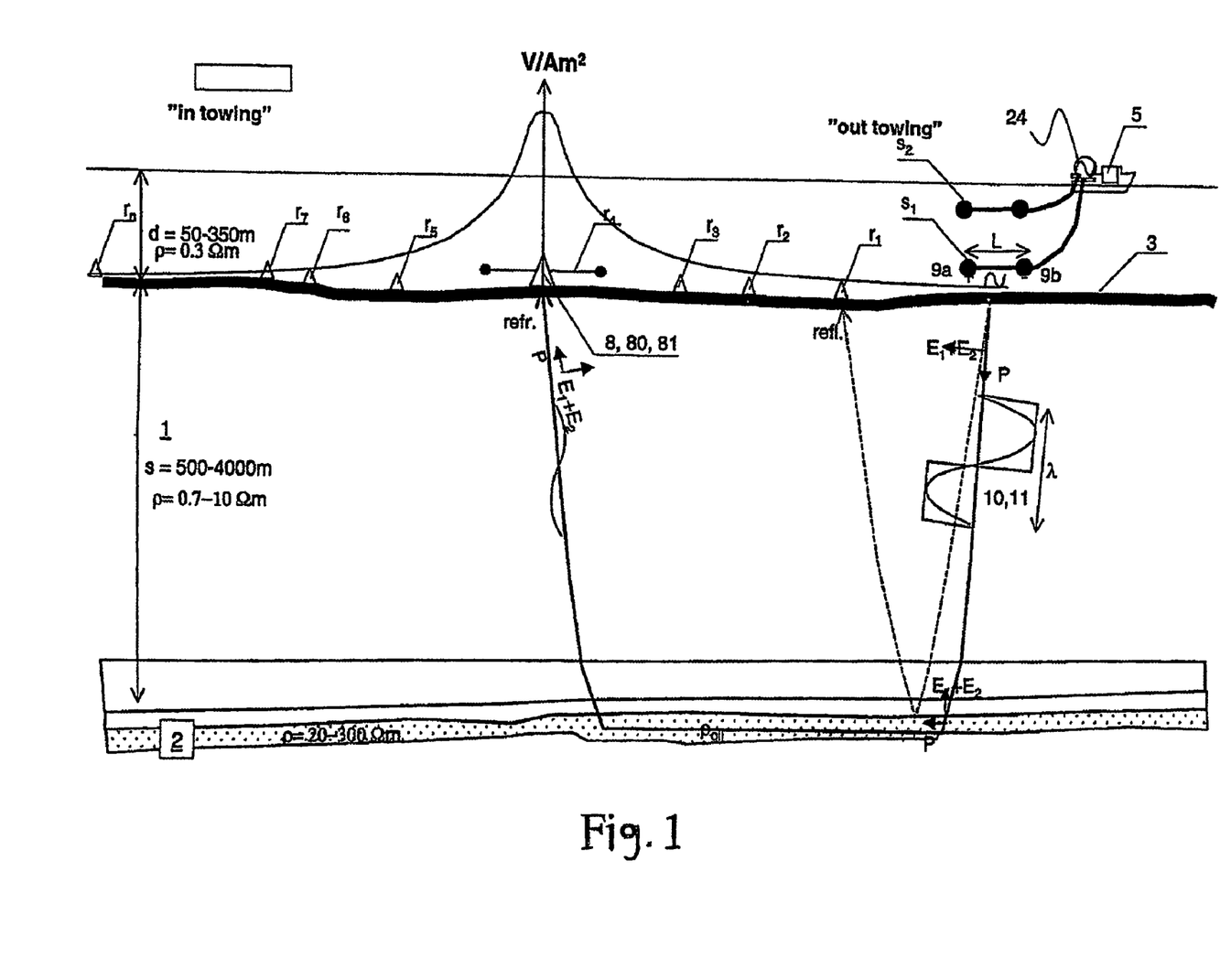
Figure 2:
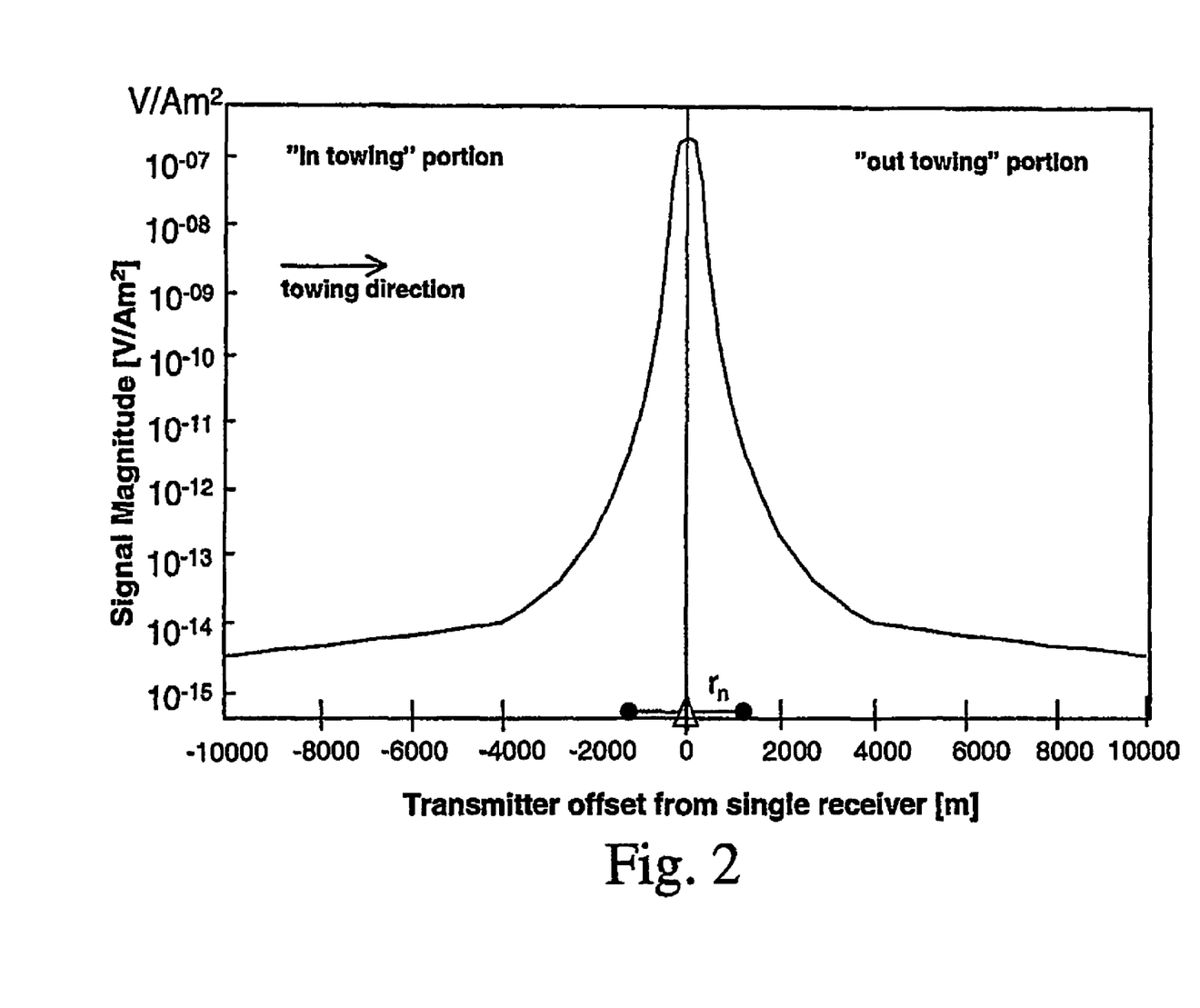
FIG. 2 illustrates such a source-normalized electric field intensity curve illustrated for one single receiver $r_n$.

FIG. 1 illustrates a real-array alternative embodiment of the invention. The method comprises simultaneous towing of two horizontal electric dipoles $s_1$ and $s_2$ through the sea. The dipoles are vertically displaced relative to each other, and are operated at different phases $\phi_1$ and $\phi_2$, and amplitudes $A_1$ and $A_2$, respectively. Electromagnetic receivers $r_1, r_2, \ldots, r_n$ such as electric dipole antennas or magnetic receivers are arranged along the seafloor 3 for measuring the electromagnetic field that has propagated, although strongly attenuated, through the sea and preferably through the rock formations 1, 2. A potential petroleum bearing formation 2, i.e. a porous sandstone formation, is indicated buried below a geological overburden 1, i.e. shales and water-bearing sandstone formations. Reflection and refraction paths are illustrated by broken and continuous lines, respectively. A source-normalized electric field intensity curve is also roughly indicated for one single stationary receiver, here receiver $r_4$, for a mobile source array moved through the sea, along and over the receivers. The transmitter dipole antennas would not economically be moved from location to location and held statically at their desired depths in the sea above a geophysical prospect geological formation situated under the seafloor, so it is highly desirable to tow the transmitter antennas behind a marine vessel. Specifically, the first, real-array dual dipole transmitter embodiment of the method according to the invention comprises the following steps:

Towing first and second alternating field $E_1$, $E_2$ emitting sources $s_1$, $s_2$ in first and second depths below the sea surface or elevations $h_1$, $h_2$ above the sea-floor 3, in which the first field $E_1$ has a first phase $\phi_1$.

The second alternating field $E_2$ is given a second phase $\phi_2$ being different from the first phase $\phi_1$, and a second amplitude $A_2$. These two sources $s_1$, $s_2$ constitute a phased array emitter antenna having directivity for transmitting a major proportion of the combined electromagnetic energy downwards.

Towing first and second alternating field $E_1$, $E_2$ emitting sources $s_1$, $s_2$ in first and second depths $d_1$, $d_2$ under the sea surface (or elevations $h_1$, $h_2$ above the sea-floor 3), in which the first field $E_1$ has a first phase $\phi_1$ and amplitude $A_1$.

The second alternating field $E_2$ is given a second phase $\phi_2$ and amplitude $A_2$ being different from the first phase $\phi_1$ and amplitude $A_1$. These two sources $s_1$, $s_2$ constitute a phased array emitter antenna having directivity for transmitting a major proportion of the combined electromagnetic energy downwards and none upwards.

The first and second fields $E_1$, $E_2$ will propagate partly down through the sea-floor 3 and being reflected and/or refracted through said rock formations 1 and partly propagating back through the seafloor 3.

The combined field $E=E_1+E_2$ is measured by electromagnetic receivers $r_1, r_2, \ldots, r_n$ recording corresponding field registrations $E_{r1}(t), E_{r2}(t), E_{r3}(t), \ldots, E_{rn}(t)$.

Figure 3A:
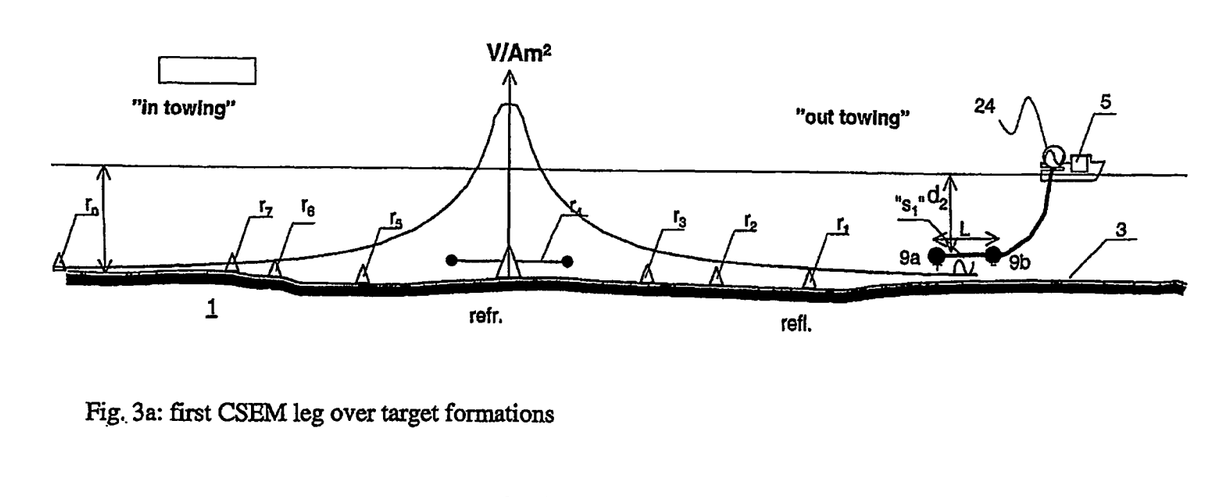
Figure 3B:
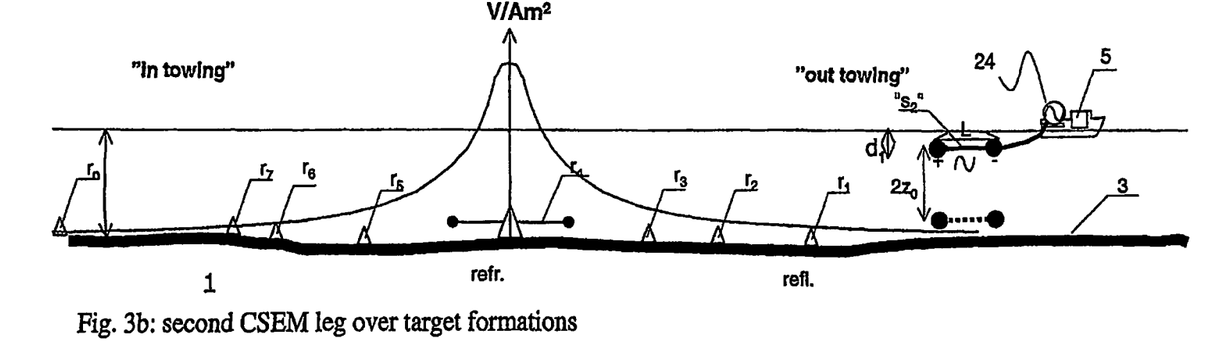

FIG. 3 illustrates a second, virtual array alternative embodiment of the invention, in which the method comprises towing of a horizontal electric dipole through the sea twice successively along the same path. The dipole depths under the surface (or heights above the seafloor) are vertically displaced relative to each other between the two passes, and the dipole is operated at phases $\phi_1$ and $\phi_2$, and amplitudes $A_1$ and $A_2$, respectively, during the two passes. As these parameters may be adjusted by altering the phases or scaling down or up the measured field intensities through the required subsequent processing steps, the actual phases and amplitudes are not required to be made different for the two sea legs. Electromagnetic receivers $r_1, r_2, \ldots, r_n$ such as electric dipole antennas or magnetic receivers are arranged along the seafloor 3 as shown in FIGS. 1 and 3 for measuring the electromagnetic field that has propagated from the transmitters, through sea and the rocks, and, in this case, also through the air, a component which shall be essentially reduced through processing steps. A potential petroleum bearing formation 2 is seen below a geological overburden 1, as for FIG. 1. The electromagnetic receivers $r_1, r_2, \ldots, r_n$ may be distributed having even separations generally along a line along the seafloor 3 as shown in FIGS. 1 and 3, but may also be distributed in any desired grid pattern on the seafloor or in the sea. Specifically, the second alternative embodiment of the method comprises the following steps:

Towing successively first and second alternating field $E_1$, $E_2$ emitting sources $s_1$, $s_2$ during separate legs, in first and second depths $d_1$, $d_2$ below the sea surface (or elevations $h_1$, $h_2$ above the sea-floor 3), in which the first field $E_1$ has a first phase $\phi_1$ and amplitude $A_1$.

The second alternating field $E_2$ is given a second phase $\phi_2$ and amplitude $A_2$ which need not at the outset differ from the first phase $\phi_1$ and amplitude $A_1$. Both phase and amplitude may be imposed during subsequent processing steps, thus it is simply required that all signal emissions and signal measurements are well time-registered.

The first and second fields $E_1$, $E_2$ will propagate separately, at each their time, partly down through the sea-floor 3 and being reflected and/or refracted through said rock formations 1 and partly propagating back through the seafloor 3. Much of the energy during each emission may leak to the air.

The first and second fields $E_1$, $E_2$ are measured separately by electromagnetic receivers $r_1, r_2, \ldots, r_n$ recording corresponding first and second field registrations $E_{1r1}(t), E_{1r2}(t), E_{1r3}(t), \ldots, E_{1rn}(t)$ and $E_{2r1}(t), E_{2r2}(t), E_{2r3}(t), \ldots, E_{2rn}(t)$ at each sensor station. The field registrations are combined to a combined registered field $E_{r1}(t), E_{r2}(t), E_{r3}(t), \ldots, E_{rn}(t)$. This is done for emulating measurements resulting from emission from a virtual phased array emitting antenna set of alternating field sources $s_1$, $s_2$ having directivity in order to transmit a major proportion of alternating field energy downwards through the seafloor 3. This may in a virtual way cancel a significant proportion of the air wave or sea multiples present in the measurements.

According to the virtual method of the invention, the addition of the first and second fields $E_{1r1}(t)+E_{2r1}(t), E_{1r2}(t)+E_{2r2}(t), E_{1r3}(t)+E_{2r3}(t), \ldots, E_{1rn}(t)+E_{2rn}(t)$ is conducted by an algorithm in a computer device as a post-processing step after the recording of the first and the second field registrations $E_{1r1}(t), E_{1r2}(t), E_{1r3}(t), \ldots, E_{1rn}(t), E_{2r1}(t), E_{2r2}(t), E_{2r3}(t), \ldots, E_{2rn}(t)$.

According to a preferred embodiment of the invention, the virtual method of addition of said first and second fields is conducted in said algorithm by varying the phase difference $\phi_2-\phi_1$ between the second phase $\phi_2$ and the first phase $\phi_1$ so as to enhance the emulated directivity of said emulated phased transmitter array.

A plurality of traversals at sea may be made towing the transmitter antenna at more than two depths, and a combination of the received signals made in order to achieve improved directivity of the simulated transmitted signals and improved magnitude of the virtually combined received signal. The selected registrations are combined with imposed amplitude ratio and phase difference in such a way as that the combined field emulates the field from a directional array as in the first, real embodiment.

Figure 4:
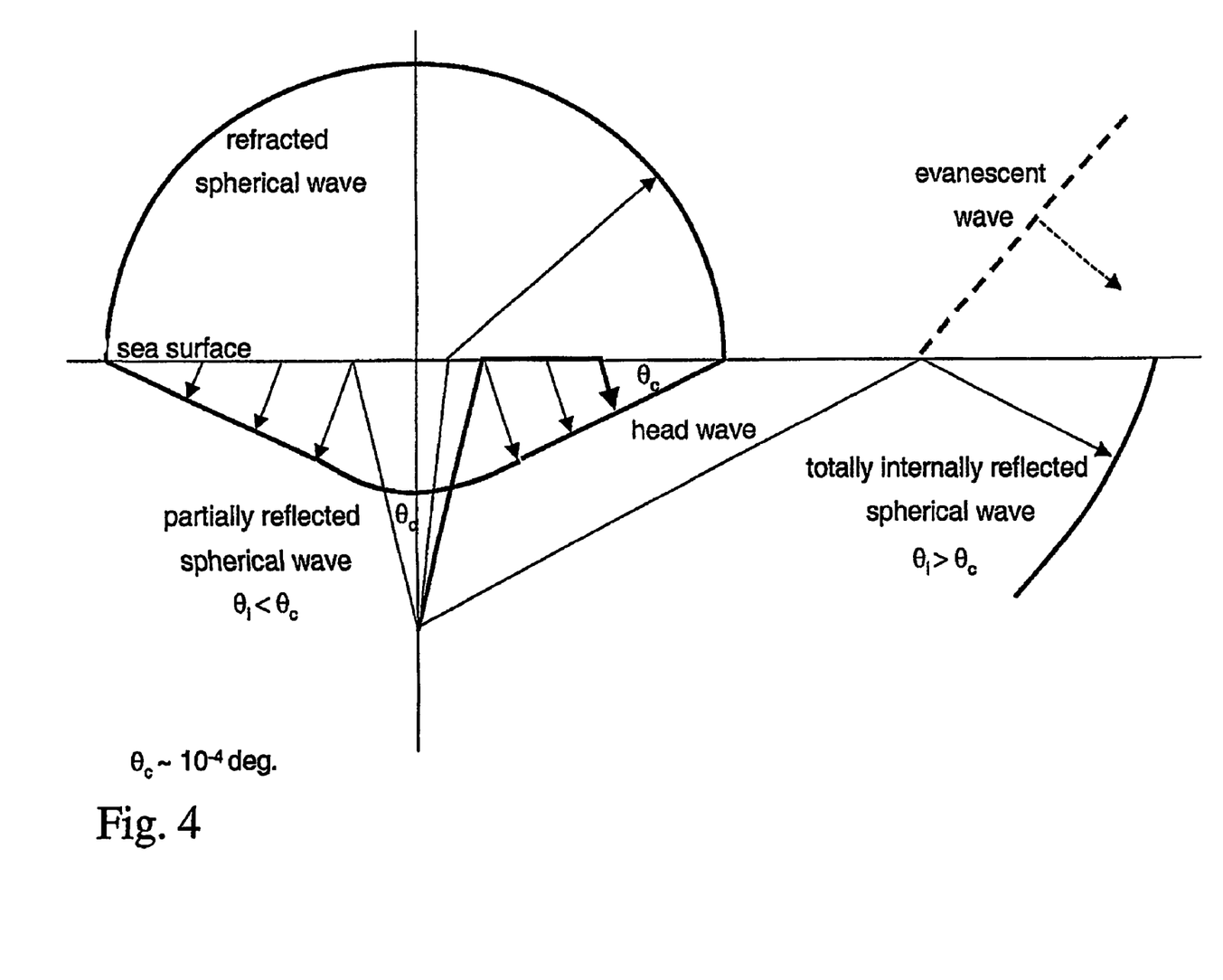
FIG. 4 illustrates some geometrical aspects about reflection and refraction of electromagnetic waves at the sea surface.

FIG. 4 illustrates some geometrical aspects of reflection and refraction at the sea surface. For waves of 1 Hz, the propagation speed is about 1760 m/s in the sea water having a conductivity $\sigma=3.2$ S/m. The propagation speed in air may be taken as $c=3*10^8$ m/s.

$$\sin(\theta_c) = v_w/c,$$

thus the critical angle of the electromagnetic wave will be $\theta_c \sim 10^{-4}$ degree from the normal to the sea surface, which is still practically vertical. This means that an extremely narrow cone of the emitted signal will penetrate through the surface to propagate as a hemispherical wave in the air. The transition about the critical angle is not as sharp as for non-conductors. Part of the wave inside the critical angle cone will be reflected as a part of a spherical wave front. The wave at the critical angle will give rise to a head wave propagating almost vertically downwards. The wave past the critical angle will be totally internally reflected as seen to the right of the figure. Empirically, the above mentioned reflected waves may not be neglected if one wishes to obtain acceptable models and interpretations of the measurements.

The basic idea is thus to try to use at least two vertically displaced dipoles and adjust the relative phase and amplitudes in order to cancel a sum of upwards propagating electromagnetic waves just below the sea surface, thus minimizing as far as practically possible the vertically upwards emitted electromagnetic wave.

The basic idea of using displaced dipole arrays to form a directive antenna array stems from G. H. Brown, 1937: "Directional antennas", Proc. I.R.E. 25, 78-145. He assumes a pair of real dipole antennae having equal amplitudes in the two dipoles. Such dual dipole arrays may not be directly employed in an absorbing medium such as sea water and the underground. The aerial transmitter antennas must be replaced with a pair of vertically separated towed marine transmitter electrode pairs, or further by a virtual array of such towed marine transmitter electrode pairs with different amplitudes in the two dipoles. Thus the idea has been further elaborated and adapted for use in marine geophysics in this patent specification.

Figure 5:
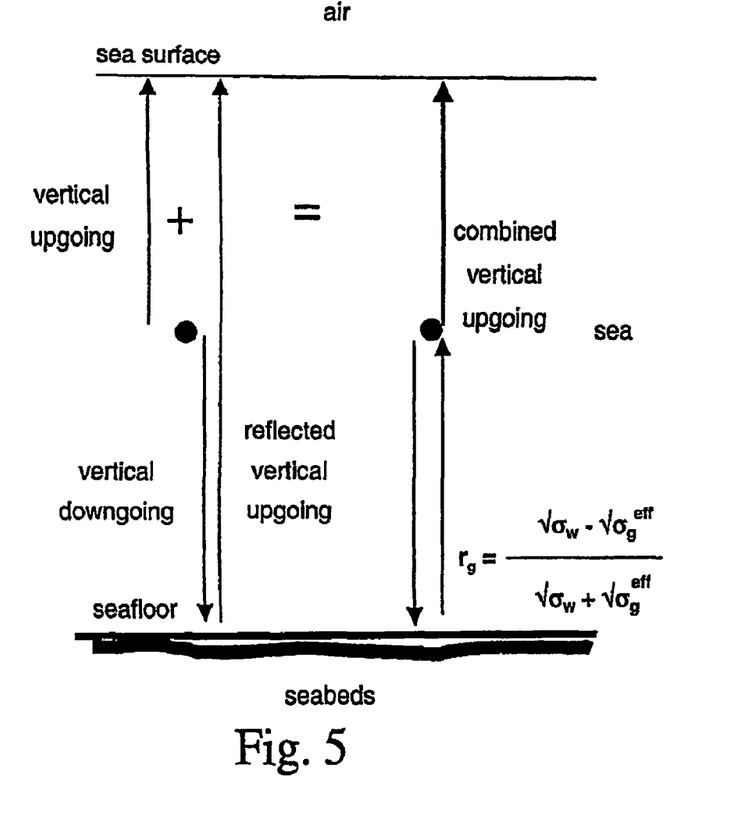
FIG. 5 is an illustration of a vertical section of the sea and the seafloor, showing the vertically upwards and downward propagating electric field directions.

The reflection coefficient for the downward propagating wave at the seafloor is $$r_{wa} = \frac{\sqrt{\sigma_w} - \sqrt{\sigma_g^{eff}}}{\sqrt{\sigma_w} - \sqrt{\sigma_g^{eff}}}$$

please refer to FIG. 5. The combined effect of the two vertically displaced dipoles is the upward radiated field from both dipoles plus the downward radiated field that is reflected from the seafloor.

Figure 6:
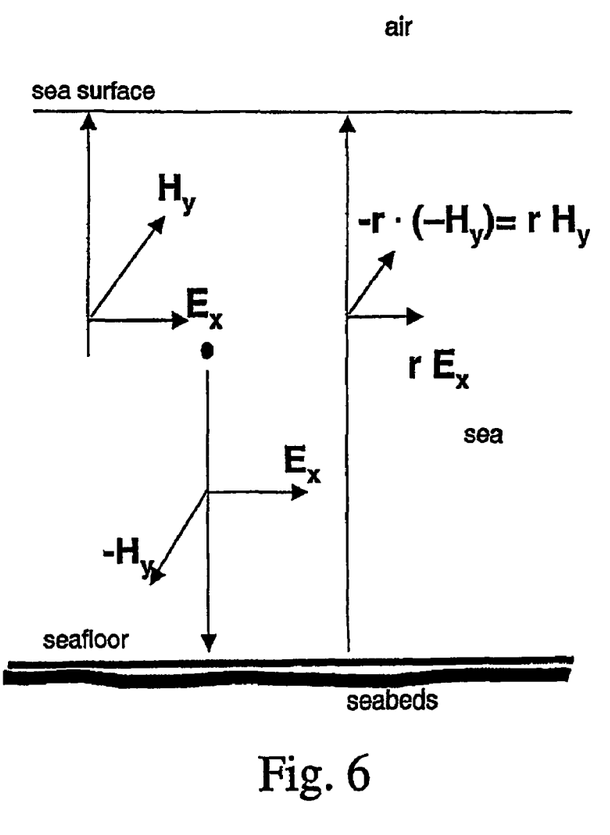
FIG. 6 shows the directions and amplitudes of down and upgoing electric and magnetic fields.

FIG. 6 is an illustration of a section of the sea and the seafloor, showing the vertically upwards and downward propagating electromagnetic field directions, both for the electric and for the magnetic fields. The change of sign for the magnetic field assures that the compensation for the electric field just below the sea surface for the dual electric dipole will also compensate for the magnetic field just below the sea surface. This assures that we may exchange electric transmitter antennas with magnetic transmitter antennas and obtain the desired airwave cancelling effect.

Figure 7:
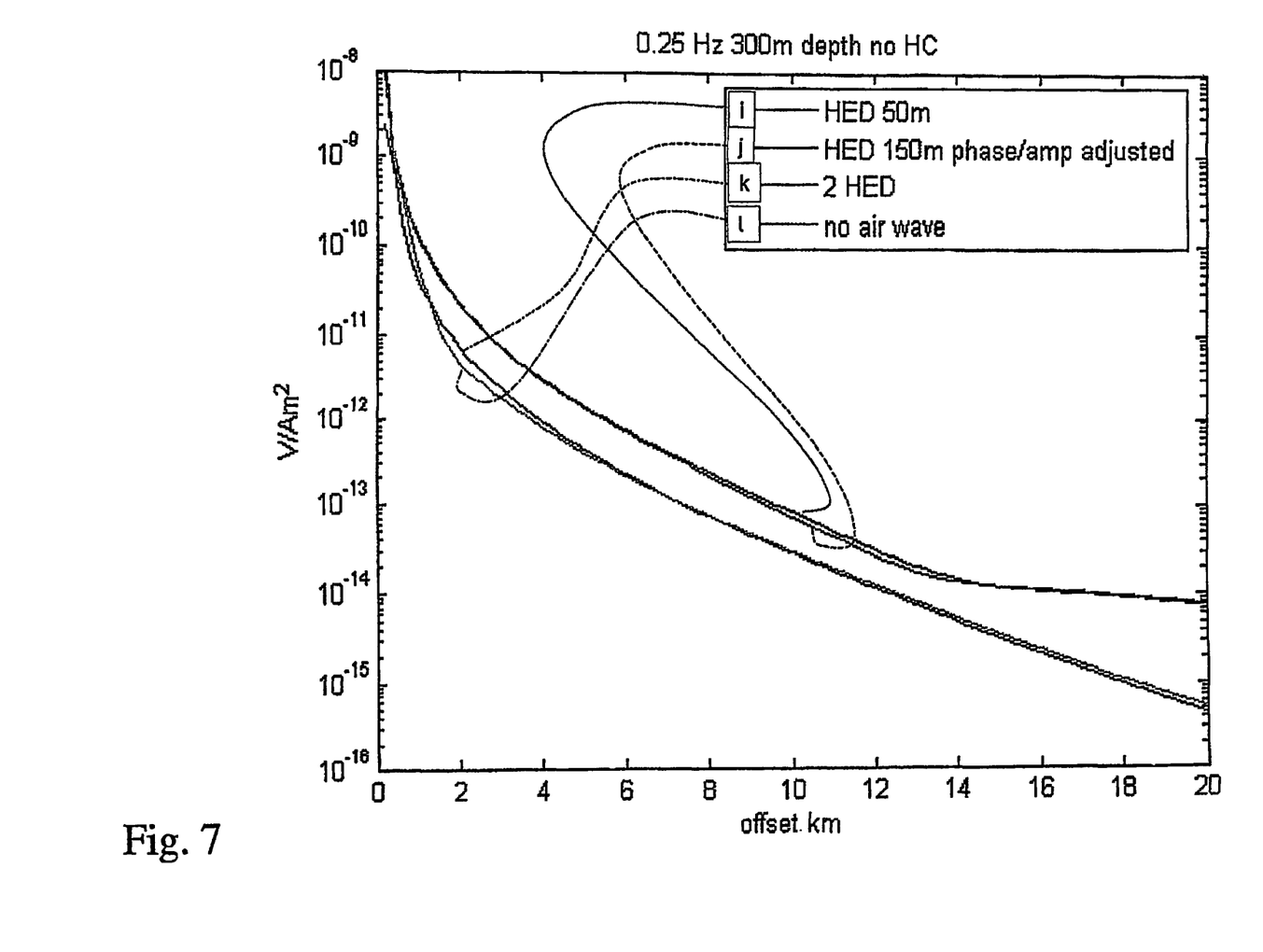
FIG. 7 is a modelled example of the removal of the air wave using the method according to the invention.

Cancellation of the upward propagating waves is achieved by properly adjusting the phase differences and the amplitude ratio between the lower and the upper horizontal electromagnetic dipole transmitters. A cancelling of upwards propagating waves will result in the avoidance of the above mentioned head wave. Further, so-called air wave multiples originating from reverberating waves in the water layer, will be significantly reduced or removed. FIG. 7 shows modelled results exhibiting successful removal of the air wave and air wave multiples using the methods described here. The cyan curve marked "ι" is calculated for infinite water depth so no air wave is present. The red curve indicated by "j" and blue curve indicated by "i" are for dipoles at different heights, 150 m and 50 m above the sea floor, respectively. The bend in the curves "i" and "j" at 14 km offset are both caused by the air wave starting to dominate at that offset. The magenta curve marked "k" is the result of combining the results for the two dipoles according to the invention. It shows no suddenly occurring sharp bend and, particularly for offsets more than about 4.5 to 5 km, lies almost exactly on top of the cyan curve marked "ι" calculated for infinite water depth showing that the air wave has been successfully removed when the method according to the invention has been applied.

Due to reciprocity, a vertically displaced set of receivers in a receiver array could be employed in the registration of the data, instead of, or in addition to, the use of a vertically displaced array for transmission.

Several advantages of a virtual dual dipole transmitter array should be considered.

Firstly, existing electromagnetic transmitters can be immediately used.

Secondly, there is no requirement for developing special waveforms for the transmitted signal. Existing electric dipole sources transmitting sine waves, square waves, etc. may be employed directly in the invention.

Thirdly, as opposed to a potential problem of undesired more or less cross-current interaction between electrodes of different dipoles having different voltages in the real dual dipole embodiment, no such undesired interaction will occur in the virtual dual dipole array embodiment.

Fourthly, in addition to the advantages present with the real dual dipole vertically displaced array, the virtual dual dipole vertically displaced array presents full processing flexibility in freely varying phase and amplitude by manipulating the registered data.

The invention claimed is:

1. A method for electromagnetic geophysical surveying of rock formations under a sea-floor, the method comprising:
   towing a phased array emitter antenna including at least two alternating field emitting sources; and
   during said towing, transmitting alternating fields with a selected phase from each of the alternating field emitting sources, the alternating fields propagating partly down through the sea-floor and being reflected and/or refracted through the rock formations and partly propagating back through the sea-floor,
   wherein the alternating field emitting sources include a first alternating field emitting source and a second alternating field emitting source,
   wherein the first alternating field emitting source is towed at a first depth and emits a first alternating field having a first phase, and the second alternating field emitting source is towed at a second depth different from the first depth and emits a second alternating field having a second phase different from the first phase, wherein the phased array emitter antenna provides directivity such that a major proportion of combined electromagnetic energy from transmission of the alternating fields is transmitted downwards and a significantly smaller proportion of the combined electromagnetic energy is transmitted upwards, wherein said alternating fields merge to a total field and are measured by electromagnetic receivers which record corresponding field registrations.

2. The method of claim 1, wherein said electromagnetic receivers are arranged generally along a line along the sea-floor.

3. The method of claim 1, wherein the alternating fields comprise vertical and horizontal electric or magnetic field components, and the method includes using combinations of the vertical electric field components or vertical or horizontal magnetic field components in operations of registration and of processing of the fields.

4. The method of claim 1, wherein the array includes both vertical and horizontal displacements of the alternating field emitting sources in order to further extend the antenna pattern.

5. The method of claim 1, wherein a phase difference and amplitude ratio between the first alternating field emitting source and the second alternating field emitting source is fixed.

6. A method for electromagnetic geophysical surveying of rock formations under a sea-floor, the method comprising:

towing a first alternating field emitting source at a first depth while emitting a first field having a first phase and first amplitude, said first field propagating partly down through the sea-floor and being reflected and/or refracted through said rock formations and partly propagating back through the sea-floor;

measuring said first field with electromagnetic receivers and recording corresponding first field registrations;

towing a second alternating field emitting source at a second depth while emitting a second alternating field having a second phase and second amplitude not necessarily different from said first phase and first amplitude, said second field propagating partly down through the sea-floor and being reflected and/or refracted through said rock formations and partly propagating back through the sea-floor;

measuring the second field with electromagnetic receivers and recording corresponding second field registrations; and combining the first and second field registrations to a combined field with a phase or amplitude imposed to at least one of the first or second field registrations for emulating measurements resulting from emission from a phased array emitting antenna set of alternating field emitting sources having directivity in order to transmit a major proportion of combined energy from emission of the alternating fields by the sources downwards through the sea-floor and a significantly smaller proportion of the combined energy upwards.

7. The method of claim 6, wherein said towing the first alternating field emitting source and said towing the second alternating field emitting source are performed consecutively over the receivers.

8. The method of claim 6, wherein the second field emitting source is the same device as the first field emitting source, and is towed in two separate runs over the receivers.

9. The method of claim 6, wherein the first and second fields are horizontal electric dipole fields.

10. The method of claim 6, wherein said combining of said first and second registrations is conducted by an algorithm in a computer device after said recording of said first and second field registrations.

11. The method of claim 10, wherein said combining of said first and second registrations is conducted in the algorithm by varying the phase difference between the second phase and the first phase so as to enhance the emulated directivity of said emulated phased transmitter array.

12. The method of claim 6, wherein the alternating fields comprise vertical and horizontal electric or magnetic field components, and the method includes using combinations of the vertical electric field components or vertical or horizontal magnetic field components in operations of registration and of processing of the fields.

13. The method of claim 6, wherein the number of antennas in the array is three or more, and the array includes both vertical and horizontal separation of the antennas thereby extending the antenna pattern.

14. The method of claim 6, wherein said towing of the second alternating field emitting source is performed after said towing of the first alternating field emitting source.

* * * * *